June 30, 1925.

H. C. EVELYN

SIGNAL FOR MOTOR VEHICLES

Filed May 16, 1921    2 Sheets-Sheet 1

1,543,704

Inventor.
Harry C. Evelyn.

By:

Att.

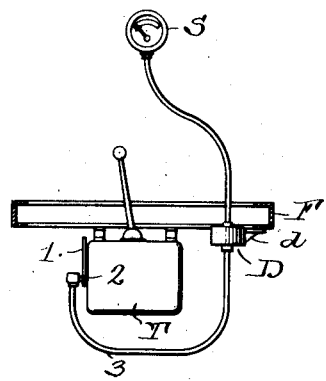
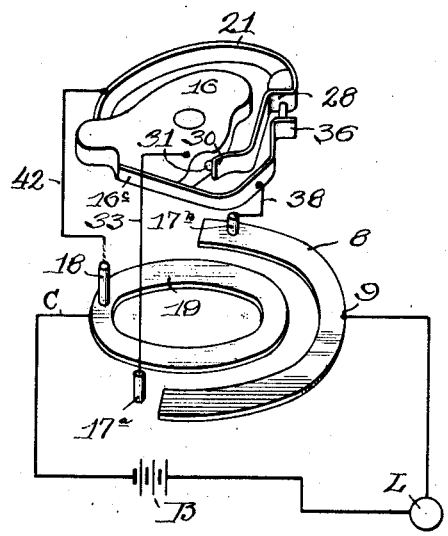
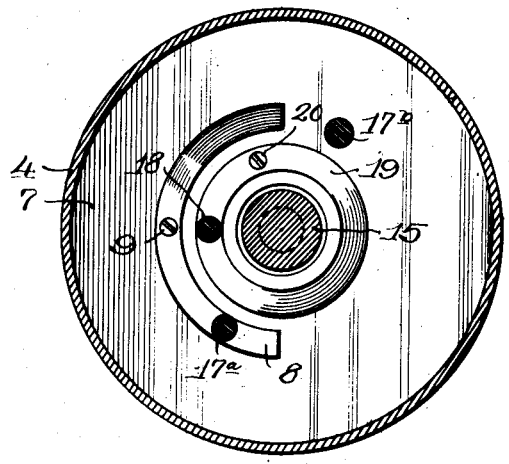

Patented June 30, 1925.

1,543,704

UNITED STATES PATENT OFFICE.

HARRY C. EVELYN, OF CHICAGO, ILLINOIS.

SIGNAL FOR MOTOR VEHICLES.

Application filed May 16, 1921. Serial No. 469,813.

*To all whom it may concern:*

Be it known that I, HARRY C. EVELYN, a citizen of the United States, and a resident of Chicago, in the county of Cook and State of Illinois, have invented certain new and useful Improvements in Signals for Motor Vehicles, of which the following is a specification.

This invention relates to improvements in signal devices for motor vehicles, and more particularly to signal devices adapted to be mounted at the rear of a motor vehicle for the purpose of providing a visual warning to other vehicles approaching from the rear.

The object of the invention is to provide a signal device which will afford greater protection to vehicles from the so-called rear end collisions by announcing, by means of a clearly visible and unmistakable signal, the fact that the preceding vehicle is traveling at a slow speed, or has come to a stop. As a preferable arrangement, an intermittently flashing or blinking light is exhibited at speeds under say ten miles an hour, which is transformed into a steady light when the vehicle comes to a stop. Moreover, the light is completely extinguished when the vehicle is traveling at greater speeds, on the supposition that the danger of collision is so greatly minimized as to eliminate the necessity of warning under such conditions.

The novel features of the invention pertain especially to the mechanism for controlling the flow of electric current to the lamp, together with the method in which the functioning of the signal device is regulated to the speed of the vehicle.

Figure 1:
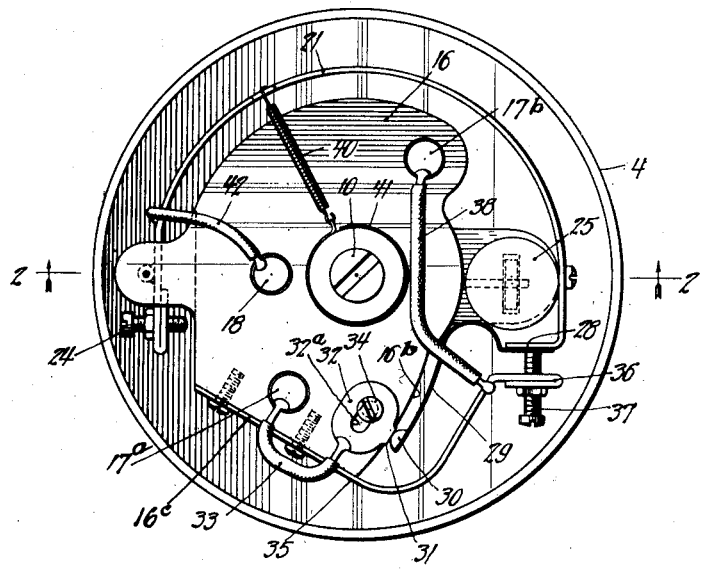
Figure 2:
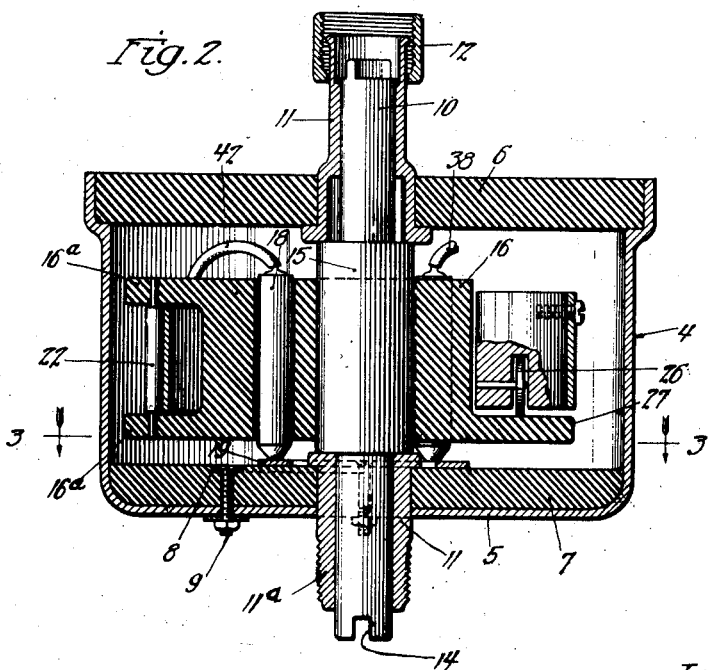

A preferred embodiment of the invention is hereinafter fully disclosed and illustrated in the accompanying drawings, wherein Fig. 1 is a top plan view of the light controlling mechanism with the top cover of the surrounding casing removed, Fig. 2 is a view in vertical section of the device taken on line 2—2 of Fig. 1, Fig. 3 is a cross-sectional view taken on line 3—3 of Fig. 2, Fig. 4 is a digrammatic view showing the manner in which the mechanism is incorporated in the flexible shaft of a speedometer, and Fig. 5 is a diagrammatic view of the lamp circuit, the electrical elements of the light controlling device, and their connections with the circuit.

As already suggested, a lamp L shown diagrammatically in Fig. 5 is mounted at some convenient point at the rear of a motor vehicle, and in such position that it is readily visible to other vehicles approaching from the rear. This lamp is preferably of the "bull's-eye" type commonly used for vehicle signals and preferably having a ruby lens because of its increased visibility. As a part of the signal device, the lamp would be distinct from, and in no way interfere with the usual rear or "tail" light. Moreover, it is provided with independent conductors C—C leading from a source of electric current such as a storage battery B, also shown diagrammatically in Figure 5. Connected or inserted in the circuit of the lamp L is the current controlling device D which functions as an automatic switch including an arrangement of circuits and circuit closing elements, which are opened and closed at predetermined speeds of the vehicle.

In order that the lamp L may act as a visual signal indicating the speed of the vehicle, it is essential that the action of the switch be regulated to the speed of the vehicle, and for this reason it is proposed as a convenient arrangement, to drive the moving parts by means of the flexible shaft connecting the speedometer or speed recording instrument S, which shaft is ordinarily connected by means of gearing to a front wheel of the vehicle, or as shown in Figure 4, is driven from the transmission T by means of a gear wheel 1 meshing with a pinion 2 fixed to the end of a flexible shaft represented by 3 (it being understood that the shaft proper is enclosed within a flexible metallic tube). The switch or current controlling device is preferably fastened at some convenient point to the frame F of the vehicle chassis by means of a bracket d whereby the cylindrically shaped casing of the device D is supported in vertical position at some point in the line of the flexible speedometer shafting 3. The rotative parts of the switch D are connected with the shaft and rotate at the same speed, which speed is accurately determined with reference to the distance traveled by the vehicle, a relationship that is necessary in order to obtain an accurate reading of the speedometer S. For instance the speedometer shaft may be so connected with the vehicle driving gear as to rotate thru one thousand revolutions for each mile that the vehicle travels.

Referring now to the device D, the same comprises a cylindric casing 4 having an integral bottom wall 5 and a removable top wall or cover 6 secured in any suitable way to the cylindric casing 4. Within the casing and covering the bottom wall 5 is a layer of insulating substance 7, such as hard rubber compound. Embedded in said layer is a semi-circular shaped contact plate 8 of a radius equal substantially to one-half that of the casing, there being connected with said contact plate a terminal conductor 9 extending downwardly thru the bottom wall 5 of the casing, and provided at its end with a suitable terminal connection to which a conductor may be secured. The contact plate 8 and the terminal conductor 9 are indicated by corresponding reference characters in Figure 5, said terminal conductor being represented as a point to which one of the conductors C of the lamp circuit is connected. Extending axially thru the casing 4 is a rotative shaft 10 mounted in bushings 11—11 extending thru the bottom wall 5, and cover 6 of the casing. As clearly shown in Figure 2, the upper bushing carries an internally threaded collar 12 adapted to make connection with the flexible shaft tubing of the speedometer, the flexible speedometer shaft being provided with a notch adapted to be engaged by a tongue 13 at the upper end of the shaft 10. At the lower end of the shaft 10 is provided a notch 14 adapted to engage a supplementary tongue of the speedometer shaft leading to the driven end thereof, the flexible tubing enclosing said shaft being provided with a threaded cap which engages the screw threaded portion 11$^a$ of the lower bushing 11. In other words, the shaft 10 is connected into the flexible speedometer shaft, and forms an integral part thereof.

The central portion of the shaft 10 is increased in diameter, forming a barrel 15 which has endwise abutting engagement with the bushings 11. Mounted upon the barrel portion 15 of the shaft is a block 16 of insulating material, said block forming the carrier for the contact members, and other electrical elements hereinafter to be described. The block rotates with the shaft 10, and therefore at the same speed as the flexible speedometer shaft. Extending transversely thru the block 16 and loosely mounted in vertical, are two contact cylinders or plugs 17$^a$—17$^b$ equidistantly spaced radially from the axis of the shaft 10, and spaced apart circumferentially from each other a distance of 180°. Furthermore, a circle passing thru the vertical axes of these contact plugs 17$^a$—17$^b$ has the same radius as the arc determining the center line of the semi-circular contact plate 8 at the bottom of the casing, so that in the rotation of the block 16, the lower ends of the contact pins 17$^a$—17$^b$ engage said plate and remain in contact therewith thruout one-half of each revolution of the block. In addition to the contact plugs 17$^a$—17$^b$, the block 16 carries a third contact plug 18 which is mounted within the block in the same manner as the plugs 17$^a$—17$^b$, but its location relative to the axis of the shaft 10, as well as to the plugs 17$^a$—17$^b$, is well defined. The radial distance from the axis of the shaft to the axis of the contact plug 18 is substantially one-half the radial distance to the contact plugs. The lower end of the contact plug 18 extends beyond the block 16 and has constant contact with a circular contact plate 19 arranged concentrically with respect to the axis of the shaft 10, and fixed to the bottom surface of the casing, and upon the layer of insulating material 7. The angular disposition of the contact plug 18 with respect to the plugs 17$^a$—17$^b$ is of no particular importance, altho as shown in Figures 1 and 5, is disposed at a convenient point substantially midway between the plugs 17$^a$—17$^b$ as measured on the arc of a circle. As thus described and clearly shown in the diagram of Figure 5, the block carries the two similar plugs 17$^a$—17$^b$ which alternately engage the same circular contact plate 8 and the single contact plug 18, which has constant contact with a circular contact plate 19. The contact plate 19 is provided with a terminal conductor 20 which projects downwardly thru the bottom wall of the casing in the same manner as the terminal conductor 9 heretofore described, and to which the conductor C (on the other side of the lamp L and battery B) is connected.

Considering now the other elements mounted upon and carried by the block 16, a semi-circular plate 21 surrounds one-half of the block and is spaced a short distance therefrom. Said plate is pivotally supported in vertical position, and in concentric relation with the shaft 10 by means of a pivot pin 22 connected adjacent one end of the plate, the same being journalled at its ends between vertically disposed radial ears 16$^a$—16$^a$. At the extreme end of said plate 21 is a set screw 24 extending transversely therethru and adapted to be adjusted longitudinally toward and from the block 16, thereby acting to limit the rotative movement of the ring 21 about the axis of the pivot pin 22 in a direction away from the block 16. The free end of the plate 21 disposed substantially diametrically opposite the point of pivotal support, carries a cylindric weight 25 secured to the inner face thereof, said weight and free end of the plate being supported by means of a vertically disposed roller 26 journalled in the weight 25 so as to project below the under surface thereof, and rests upon an upwardly facing surface of the block 16, formed by cutting away portions thereof adjacent the free end of the plate, leaving an ear 27 projecting from the lower edge of the block. The extremity of the free end of the semi-circular plate 21 is bent inwardly to form a short radial arm 28 located immediately beyond the weight 25, said arm having attached thereto a metallic contact strip 29 curving inwardly toward the axis of the shaft 10, and thence outwardly in a general oblique direction parallel to the prolongation of the plate 21. At the end of the contact strip 29 is provided a contact point 30 adapted to bear against a metallic contact strip 31 extending transversely against a vertical face 16$^b$ of the block 16 substantially in parallel relation to the contact strip 29. The contact strip 31 is an integral part of a metallic terminal plate 32 electrically connected to one of the contact plugs 17$^a$ nearest to it by means of a conductor wire 33. The terminal plate 32 is preferably oval in shape and provided with a centrally located slot 32$^a$ thru which the adjusting screw 34 extends, the latter being anchored in the block 16. This arrangement permits the contact plate to be shifted in a direction parallel to the vertical face 16$^b$ of the block 16, thus enabling the position of the contact strip to be shifted with relation to the contact point 30. Attached to a straight vertical face 16$^c$ of the block 16 and at right angles to the face 16$^b$ thereof, is a bar 35 projecting horizontally from the block at right angles to said surface 16$^b$ thereof in the direction of the arm 28 at the end of the semi-circular plate 21, said bar terminating in a finger 36 disposed in parallel relation to the arm 28 of the plate 21, and carrying an adjustable contact screw 37 which bears against said arm 28. Connecting the extremity of the bar 35 with the other contact plug 17$^b$ is a conductor wire 38 thereby establishing an electrical connection between the semi-circular plate 21 and said plug thru the conductor screw 37. Similarly, the conductor wire 33 establishes electrical connection between the plug 18 and the terminal plate 32, and its contact strip 31.

The semi-circular plate 21, by reason of its pivotal connection at one end with the block 16, is capable of limited rotative movement relative thereto under the centrifugal force acting thereon as the block is rotated, this centrifugal force being accentuated by the weight 25 mounted at the free end of the plate 21. Opposing the centrifugal force, there is provided a coil spring 40 attached at one end with said plate at a point removed from the pivoted end an angular distance of say 60°, the other end being attached to a ring 41 which surrounds the upper portion of the shaft barrel 15.

Considering now the manner in which the current is supplied to the lamp L from the battery B, and assuming first that the vehicle is stationary, and therefore that the rotative parts of the device are also stationary, the current may be considered as flowing from the battery B to the circular contact plate 19. From the contact plate 19 the current passes thru the contact plug 18 and is conducted by means of a conductor 42 directly to the semi-circular plate 21, said conductor 42 having electrical connection with said plate adjacent the point of pivotal support, as shown in Figure 1. The current flows toward the free end of the plate 21 and from the arm 28 thereof either thru the contact screw 37 and conductor 38 to one of the contact plugs 17$^b$ or thru the contact member 30 to the contact strip 31 and plate 32, thence thru the conductor 33 to the other contact plug 17$^a$. Ordinarily, when the block is in stationary position, only one of the contact plugs 17$^a$ or 17$^b$ will be in contact with the semi-circular contact plate 8. Thus the current will flow to the particular contact plug which is in contact with the plate 8 following either of the circuits above traced. Thus assuming as in Figure 5, that the contact plug 17$^b$ connected to the plate 21 by means of the conductor 38 and contact screw 37 is in contact with the contact plate 8, a closed circuit is formed. Similarly a closed circuit would be formed if the other plug were in contact with the plate 8. Having thus provided a closed circuit regardless of which plug contacts with the semi-circular plate 8, it is apparent that a continuous current will be supplied to the lamp, and it will burn steadily so long as both circuits remain closed.

Now let it be assumed that the vehicle is started and travels at a comparatively slow speed; the shaft 10 and block 16 being driven at a corresponding slow speed, the centrifugal force accompanying the rotation of the block is exerted upon the weight 25 at the free end of the plate 21, with the result that said free end is thrown outwardly from the block, thus breaking contact between the contact screw 37 and the arm 28 at the end of the plate 21. The breaking of this contact opens the circuit leading thru the conductor 38 to the contact plug 17$^b$ connected therewith, this circuit thus becoming dead. At the assumed speed, however, the contact point 30 remains in contact with the strip 31 so that the circuit thru the conductor 33 leading to the other contact plug 17$^a$ remains closed from the plug 18 to the active plug 17$^b$. Since the flow of current to the lamp is thru the semi-circular contact plate 8, it is manifest that the lamp circuit remains closed during one-half a revolution of the shaft only; that is to say, during each revolution of the shaft 10 the lamp will burn during one-half revolution, and will be extinguished during the remaining one-half revolution, thus producing an intermittent flashing or "blinking" light.

So long as the vehicle continues to travel at a speed not exceeding the predetermined limit, the lamp will function to produce the intermittent flashes or "blinking" light, but when the speed exceeds such limit (say, ten miles per hour), the centrifugal force exerted upon the mass 25 is sufficient to displace the weight at a still greater radial distance from the axis of the shaft 10, whereupon the contact point 30 is displaced to such an extent that contact is broken between it and the contact strip 31. The immediate result is a complete interruption of the current flow to the lamp L, inasmuch as both circuits leading to the contact plugs 17ª—17ᵇ are now open. In other words, the lamp circuit becomes dead and remains so so long as the speed of the vehicle exceeds that at which the circuit is open. Manifestly, as the speed of the car is again decreased, as, for instance, when it is slowing up for the purpose of stopping or turning a corner, contact is re-established thru one of the contact plugs 17ª or 17ᵇ, and thus the intermittent or blinking light again functions and continues to function in this manner until the vehicle is brought to a dead stop, in which case the lamp circuit is closed thru one or both of the contact plugs 17ª or 17ᵇ, with the result that a constant current flow is supplied to the lamp, and the same burns steadily as hereinbefore described.

Having fully described the invention, I claim as new and novel in the art to which it relates:

1. In a signal device for vehicles, the combination of a rotative member adapted to be driven at a rate of speed varying proportionately with that of the vehicle, a switch member pivotally mounted on said rotative member and adapted to be shifted relatively thereto by centrifugal force, a plurality of contact members mounted on said rotative member and forming elements of a plurality of parallel circuits, said contact members being adapted for contact adjacent the free end of said switch member and coacting therewith to successively open said circuits as the speed of said rotative member is increased.

2. In a signal device for vehicles, the combination of a rotative block adapted to be driven at a speed varying proportionately with the speed of the vehicle, a plurality of parallel circuits comprising terminals mounted on said block, a centrifugal switch member mounted on said block and adapted for contact with said terminals to close said circuits in the non-rotative position of said block to open one of said circuits in the initial rotation of said block, and to open another circuit when a predetermined speed is reached.

3. In a signal device for vehicles, the combination of a rotative body member adapted to be driven at a rate of speed varying proportionately with that of the vehicle, a plurality of circuits including contact plates, and a centrifugal switch carried by said body member and forming a common conductor for said circuits, said body and switch member being provided with contact points for closing said circuits, one of said contacts being opened at a relatively low speed of rotation of said body member and another at a predetermined increased speed.

4. In a signal device for vehicles, the combination of a centrifugal switch member, a rotative switch supporting member adapted to be driven at speed varying proportionately to that of the vehicle, a plurality of circuits including fixed contact plates and brushes mounted in said supporting member, said switch member forming a conductor common to said circuits, said supporting and switch members having contact points adapted to close said circuits in the non-rotative position of said supporting member and to be successively broken at predetermined increased speeds.

5. In a signal device for vehicles, the combination of a rotative shaft adapted to be driven at a rate of speed corresponding to that of the vehicle, a centrifugal switch member mounted on said shaft, a circuit including said switch member, brush and plate contact member, having intermittent contact in the rotation of said switch member and a relatively fixed terminal adapted to have a point contact with said switch member.

6. In a signal device for vehicles, the combination of a rotative shaft adapted to be driven at a speed corresponding to the speed of the vehicle, a contact brush carried by said block and spaced radially from the axis of rotation thereof, a fixed plate in constant contact with said brush, a centrifugal switch member mounted on said shaft, a circuit including said switch member and a plurality of circuits having relatively fixed terminals adapted for contact with said switch member, and means acting on said switch member, to oppose the centrifugal force extended thereon, to open said circuits at different speeds of rotation of said shaft.

7. A signal device for vehicles comprising a casing, a shaft journalled in said casing and adapted to be driven at a speed varying proportionately to the speed of the vehicle, a supporting member mounted on said shaft, a switch member pivotally mounted on said supporting member and adapted to be shifted relatively thereto by centrifugal force, means for conducting electric current to said switch member comprising brushes and contact plates mounted in said block and casing, one of said plates being adapted for intermittent contact with two of said brushes, terminals fixed to said block adjacent the free end of said switch member and having electrical connection with two of said brushes, said switch member having contact points adapted to close the circuits through said terminals and to successively open said circuits at different and predetermined speeds of rotation of said shaft.

8. In a signal device for vehicles, the combination of a rotative block adapted to be driven at a speed corresponding to the speed of the vehicle, a contact brush carried by said block and spaced radially from the axis of rotation thereof, a fixed plate in constant contact with said brush, a centrifugal switch member mounted on said block and in electrical connection with said brush, a plurality of contact points at the free end of said switch member and adjacent portions of said block, brushes carried by said block and electrically connected with said contact points on said block, a fixed contact plate adapted for intermittent contact with said last mentioned brushes, said switch member being actuated by centrifugal force to break one contact at said points upon the initial rotative motion of said block, and the other at a predetermined increased speed of rotation.

9. A switch for controlling a signal device for vehicles comprising a rotative body member, driven at a speed varying proportionally to the speed of the vehicle, fixed terminal contacts adjacent said body member, wiping contact members carried by said body member and adapted for make and break contact in the rotation of said body member, and a circuit closing member pivotally mounted on said body member, and normally closing a circuit through said contact members in the rotation of said body member at a speed less than a predetermined speed of the vehicle and to open said circuit at a speed in excess of said predetermined speed of the vehicle.

In witness whereof, I hereunto subscribe my name this 12th day of May, A. D., 1921.

HARRY C. EVELYN.